No. 617,870. Patented Jan. 17, 1899.
F. AGGE & W. B. NYE.
FILTER.
(Application filed Dec. 31, 1897.)
(No Model.) 5 Sheets—Sheet 2.

No. 617,870. Patented Jan. 17, 1899.
F. AGGE & W. B. NYE.
FILTER.
(Application filed Dec. 31, 1897.)

(No Model.) 5 Sheets—Sheet 3.

Witnesses.
John F. C. Preinkert
J. Murphy.

Inventors.
Franklin Agge
Walter B. Nye
by Jas. H. Churchill
atty.

No. 617,870. Patented Jan. 17, 1899.
F. AGGE & W. B. NYE.
FILTER.
(Application filed Dec. 31, 1897.)
(No Model.) 5 Sheets—Sheet 4.

Witnesses:

Inventors
Franklin Agge
Walter B. Nye
by Jas. H. Churchill, Atty.

No. 617,870. Patented Jan. 17, 1899.
F. AGGE & W. B. NYE.
FILTER.
(Application filed Dec. 31, 1897.)

(No Model.) 5 Sheets—Sheet 5.

WITNESSES.
Matthew M. Blunt
J. Murphy.

INVENTORS.
Franklin Agge
Walter B. Nye
by Jas. H. Churchill
ATT'Y.

UNITED STATES PATENT OFFICE.

FRANKLIN AGGE, OF SALEM, AND WALTER B. NYE, OF BROOKLINE, MASSACHUSETTS, ASSIGNORS, BY MESNE ASSIGNMENTS, TO THE NEW YORK FILTER MANUFACTURING COMPANY, OF NEW JERSEY.

FILTER.

SPECIFICATION forming part of Letters Patent No. 617,870, dated January 17, 1899.

Application filed December 31, 1897. Serial No. 664,899. (No model.)

*To all whom it may concern:*

Be it known that we, FRANKLIN AGGE, of Salem, county of Essex, and WALTER B. NYE, of Brookline, county of Norfolk, in the State of Massachusetts, have invented an Improvement in Filters, of which the following description, in connection with the accompanying drawings, is a specification, like letters on the drawings representing like parts.

This invention relates to filters, and is herein shown as embodied in a filter of the class shown and described in United States Patent No. 404,236, dated May 28, 1889, in which a revolving agitator is employed to loosen up the filter-bed, and thereby facilitate the removal of sedimentary or foreign matter from the filter.

This invention has for one of its objects to provide simple and efficient means for operating the agitator, whereby the latter may be actuated with a minimum amount of power and at a minimum expense in a filter of increased capacity.

Another feature of this invention consists in an efficient and novel construction of the filter tank or vessel, as will be described.

These and other features of this invention will be pointed out in the claims at the end of this specification.

Figure 1:
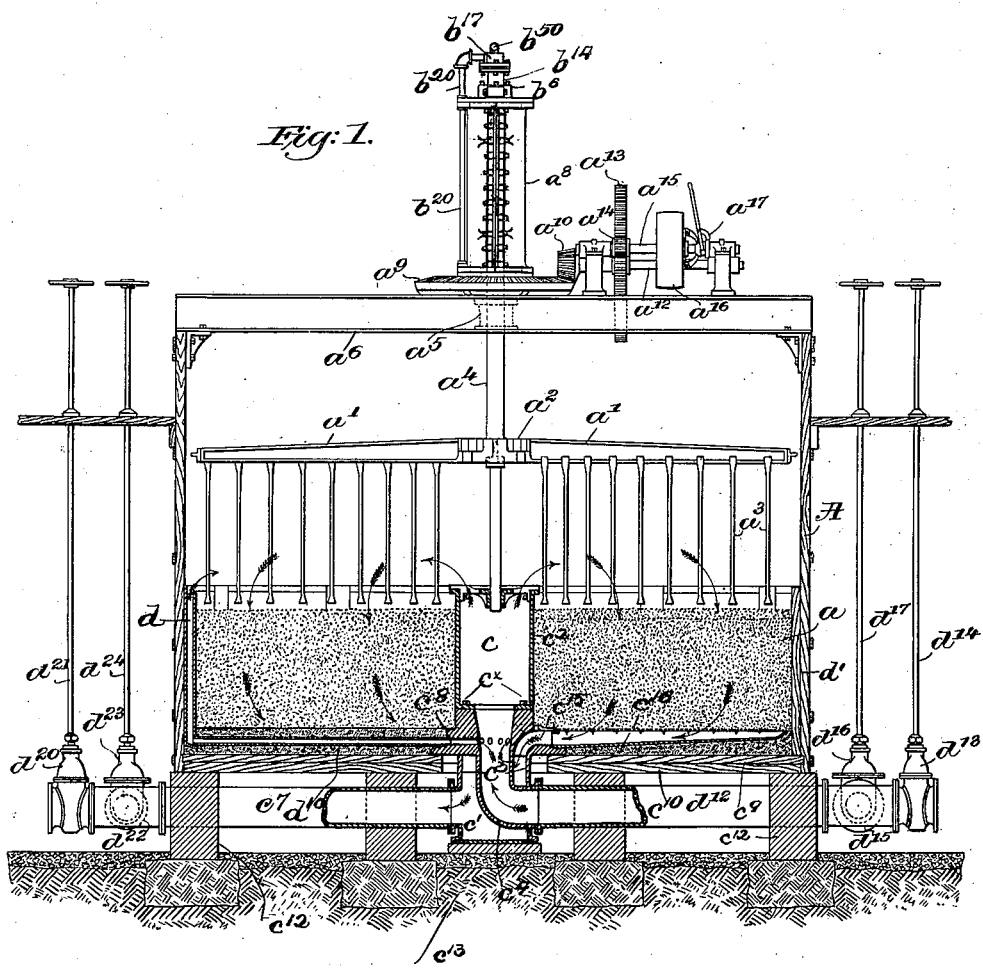
Figure 2:
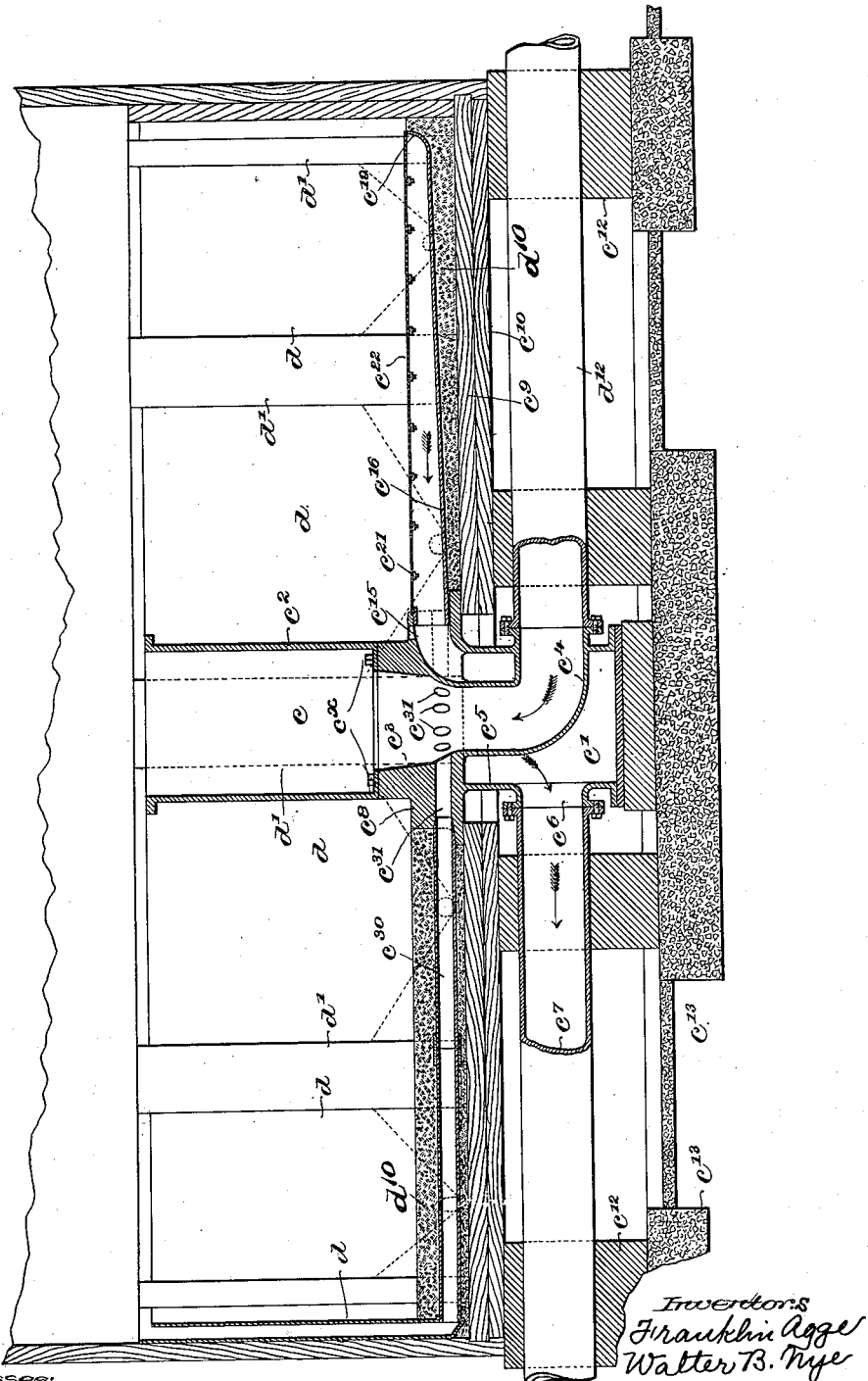
Figure 3:
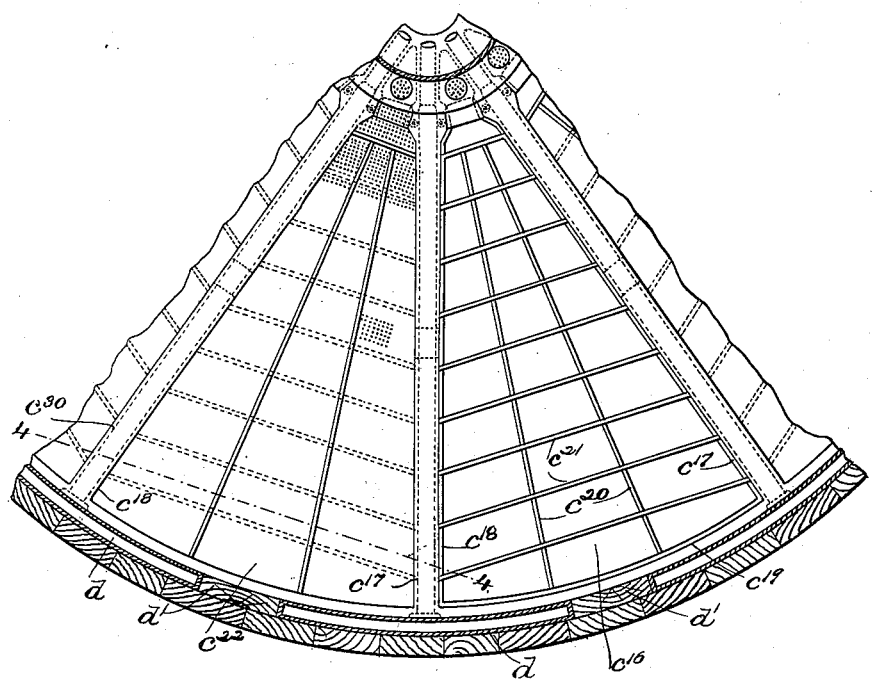
Figure 4:
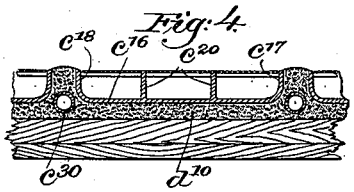
Figure 5:
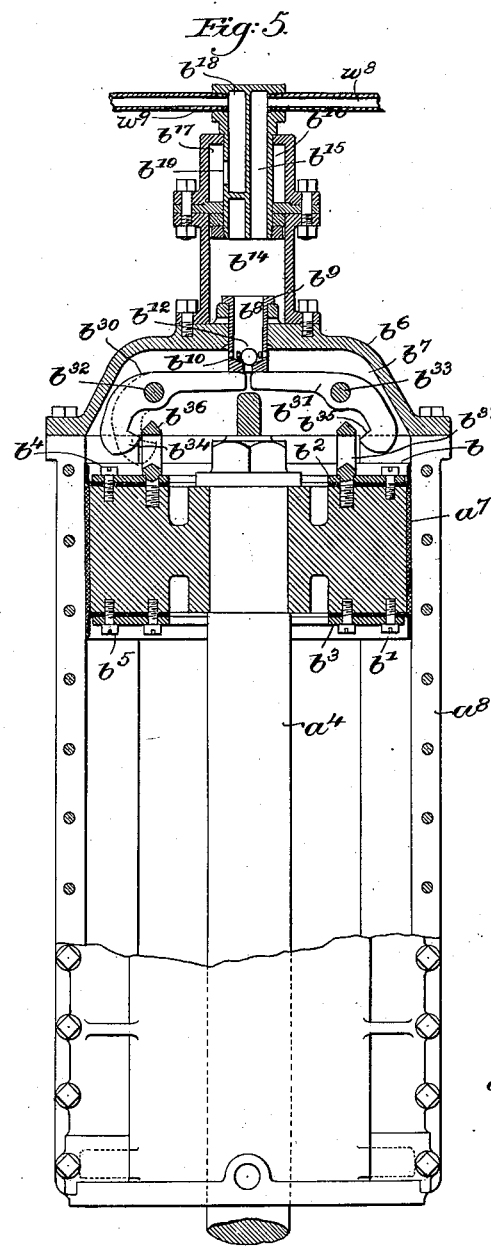
Figure 6:
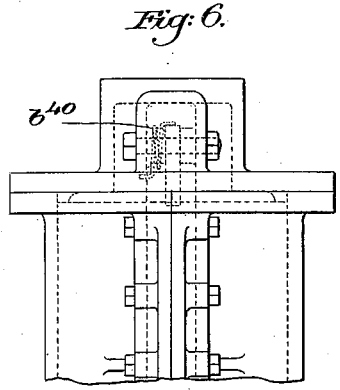
Figure 7:
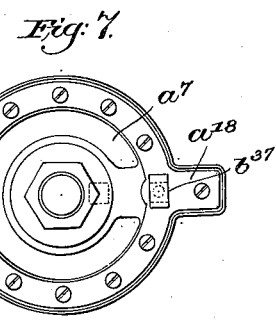
Figure 8:
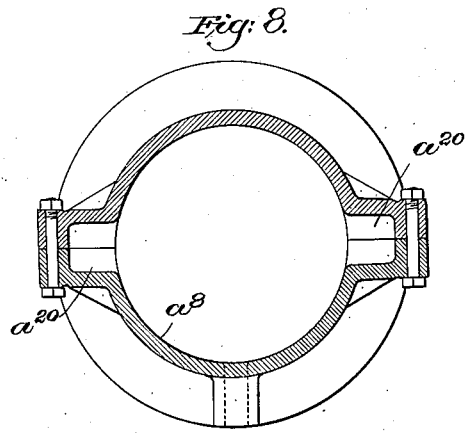

Figure 1 is a section and elevation of a filter embodying this invention; Fig. 2, a sectional detail, on an enlarged scale, of the lower portion of the tank or vessel shown in Fig. 1; Fig. 3, a detail in plan of a portion of the filter tank or vessel shown in Fig. 2; Fig. 4, a sectional detail to be referred to, the section being taken on the line 4 4, Fig. 3; Fig. 5, a detail on an enlarged scale, in section and elevation, of a portion of the agitator-operating mechanism; Figs. 6, 7, and 8, details to be referred to; and Figs. 9, 10, and 11, details of the valve mechanism for controlling the operation of the agitator, to be referred to.

The tank or vessel A, of circular form and of a novel construction, as will be described, contains within it a filter-bed $a$, of sand or other suitable granular material, which is adapted to be loosened up by means of an agitator, which may be of substantially the construction shown in the patent referred to, and consists of a series of radial arms $a'$, radiating from a hub $a^2$ and having depending teeth $a^3$. The hub $a^2$ in accordance with this invention is fast on a piston-rod $a^4$, having its upper end extended through a suitable bushing or hub $a^5$ (see dotted lines, Fig. 1) in an opening in a cross-bar $a^6$, forming part of the support for the operating mechanism for the agitator.

The piston-rod $a^4$ is provided at its upper end with a piston $a^7$, preferably of the form or construction herein shown (see Fig. 7) and which will be hereinafter described. The piston $a^7$ is adapted to be reciprocated in a cylinder $a^8$, which preferably forms part of the rotating mechanism for the agitator.

In the present instance the cylinder $a^8$ has secured to its lower end (see Fig. 1) a substantially large gear $a^9$, driven by a pinion $a^{10}$ on a shaft $a^{12}$, provided with a gear $a^{13}$ in mesh with a pinion $a^{14}$ on a shaft $a^{15}$, constituting a main or driving shaft, and provided with a driving-pulley $a^{16}$ and a suitable clutch mechanism $a^{17}$.

The piston $a^7$ is movable longitudinally in its cylinder and may and preferably will be provided at substantially diametrically opposite points with radial lugs or projections $a^{18}$, extended beyond the circumference of the piston and into suitable guideways $a^{20}$, extended longitudinally of the cylinder $a^8$.

The radial lugs or projections $a^{18}$ and the guideways $a^{20}$ form a positive connection between the piston $a^7$ and the cylinder $a^8$, whereby rotation of the said cylinder may effect rotation of the piston without interfering with its reciprocation in said cylinder.

The piston $a^7$ may and preferably will be rendered liquid-tight in the cylinder $a^8$ by means of suitable packing cups or rings $b\ b'$, secured to the opposite faces of the said piston by metal rings or plates $b^2\ b^3$, fastened to the said piston by bolts $b^4\ b^5$.

The piston $a^7$ is adapted to be reciprocated in the cylinder $a^8$ by means of water or other fluid admitted into the cylinder at its opposite ends. The cylinder $a^8$ may and preferably will be provided, as shown in Figs. 5 and 6, with a raised cap or cover $b^6$, forming a chamber $b^7$, provided with a water-inlet pipe $b^8$, preferably of the construction herein shown and constituting a cylindrical valve. The inlet-pipe $b^8$ is vertically movable in the cover or cap $b^6$ and is provided at its upper end with a flange $b^9$ and in its sides near its lower end with a series of ports or openings $b^{10}$, and the said inlet-pipe is preferably provided with a bottom having a substantially large port or opening with which coöperates a ball-valve $b^{12}$.

The inlet pipe or valve $b^8$ extends into a chamber $b^{14}$, with which communicates a passage $b^{15}$ in a divided pipe $b^{16}$, which latter is extended through a chamber $b^{17}$, with which communicates a passage $b^{18}$ in the divided pipe $b^{16}$. The passage $b^{18}$ communicates with the chamber $b^{17}$ through a port $b^{19}$ in the pipe $b^{16}$, and the chamber $b^{17}$ is connected by a pipe $b^{20}$ with the cylinder $a^8$ near its bottom and below the piston therein. (See Fig. 1.)

Figure 9:
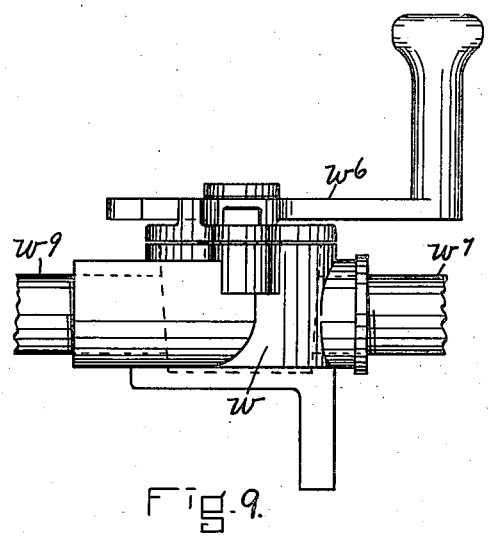
Figure 10:
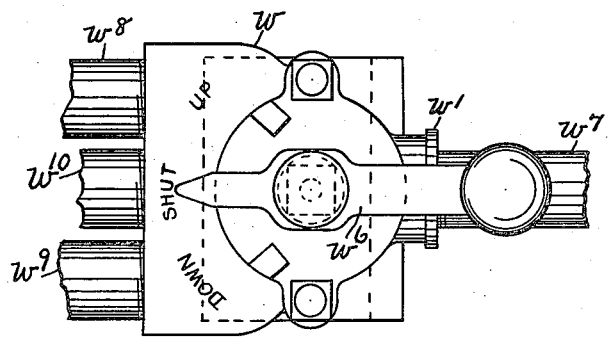
Figure 11:
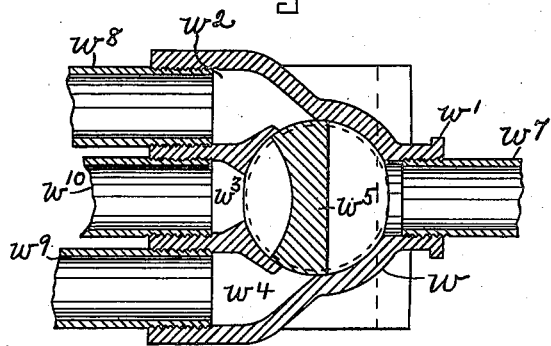

The passages $b^{15}$ $b^{18}$ are adapted to be alternately connected to a liquid supply and discharge pipe, as will be described. The flow of water into the cylinder $a^8$ may and preferably will be controlled by a suitable valve mechanism, which may be located in any place convenient to the operator. In Figs. 9 to 11, inclusive, is shown a form of valve mechanism preferred by us and which consists of a casing $w$, provided with ports $w'$ $w^2$ $w^3$ $w^4$, controlled by a valve $w^5$, which is rotated or turned by a lever $w^6$. The port $w'$ has connected to it a supply-pipe $w^7$. The port $w^2$ is connected by pipe $w^8$ to the passage $b^{15}$, the port $w^4$ by pipe $w^9$ to the passage $b^{18}$, and the port $w^3$ has connected to it the waste-pipe $w^{10}$. The valve $w^5$ is shown as in its closed position, and at such time the piston $a^7$ is stationary. When the lever $w^6$ is turned so that it points to the word "Down," Fig. 10, the valve $w^5$ is turned so as to connect the supply-pipe $w^7$ with the passage $b^{14}$ through the pipe $w^8$, and water or other fluid is admitted into the chamber $b^{14}$, from which it flows through the inlet-pipe $b^8$ and ports $b^{10}$ into the cylinder above the piston. At the same time the pipe $w^9$ is connected with the waste-pipe $w^{10}$. When the lever $w^6$ is turned so that it points to the word "Up," the supply-pipe $w^7$ is connected to the passage $b^{18}$ through the pipe $w^9$, and water is admitted into the chamber $b^{17}$ through the port $b^{19}$, and from said chamber it flows through the pipe $b^{20}$ into the cylinder $a^8$ below the piston $a^7$. By this movement of the lever $w^6$ the pipe $w^8$ is connected with the waste-pipe $w^{10}$. When the water is admitted into the cylinder above the piston $a^7$, the latter is moved downward in its cylinder and the agitator is carried down with it and the teeth $a^3$ of the latter are inserted into the filter-bed. As the piston $a^7$ is moved down in its cylinder the water in the cylinder below the piston is forced out through the pipe $b^{20}$ into the chamber $b^{17}$, from which it flows through the port $b^{19}$, passage $b^{18}$, pipe $w^9$, and valve-casing $w$ to the waste or discharge pipe $w^{10}$. When the flow of water is reversed and it is admitted into the cylinder below the piston, the latter is moved upward in its cylinder and the agitator is lifted out of the filter-bed. When the piston is moved upward in its cylinder, the water therein above the piston is forced out through the inlet-pipe $b^8$ through the port in its bottom, the ball-valve $b^{12}$ being lifted from its seat and into the chamber $b^{14}$, from which it flows through the passage $b^{15}$, pipe $w^8$, and valve-casing $w$ to the waste or discharge pipe $w^{10}$.

It is desirable that the agitator should be kept elevated above and out of contact with the filter-bed during the process of filtration, and as the water acting on the under side of the piston might leak by the piston into the cylinder above the piston which is connected with the discharge or exhaust pipe we prefer to mechanically suspend the piston in its elevated position. This result may and preferably will be accomplished by an automatically-operated locking device, preferably of the construction herein shown (see Figs. 5 and 6) and consisting of two levers $b^{30}$ $b^{31}$, loosely mounted on pins or rods $b^{32}$ $b^{33}$, supported in the sides of the cap $b^6$ and provided at one end with hooks $b^{34}$ $b^{35}$ to engage eyebolts $b^{36}$ $b^{37}$, attached to the top of the piston $a^7$. The levers $b^{30}$ $b^{31}$ have their long arms extended into line with the movable inlet pipe or valve $b^8$ and are adapted to be turned on their pivot-pins $b^{32}$ $b^{33}$ by said inlet-pipe to unlock the piston and to be turned in the opposite direction to lock the piston by means of suitable springs $b^{40}$, only one of which is shown by dotted lines in Fig. 6. The springs $b^{40}$ have one end engaged with the levers $b^{30}$ $b^{31}$ and their other end fastened to the cap $b^6$, as shown in Fig. 6.

By an inspection of Fig. 5 it will be seen that when the water is admitted into the chamber $b^{14}$ the inlet-pipe or piston-valve $b^8$ is forced down by the water and acting on the long arms of the levers $b^{30}$ $b^{31}$ turns the latter on their pivots and disengages the hooked ends of said levers from the eyebolts $b^{36}$ $b^{37}$ and moves the said levers into the position represented by full lines, Fig. 5. The locking-levers $b^{30}$ $b^{31}$ are maintained in this position as long as the water-pressure is on the inlet pipe or valve $b^8$; but when the pressure of the water is transferred to the under side of the piston, as above described, the pressure is removed from the inlet pipe or valve and the springs $b^{40}$ turn the locking-levers into line with the eyebolts $b^{36}$ $b^{37}$, so that when the piston $a^7$ reaches the end of its upstroke the locking-levers are automatically engaged with the eyebolts and mechanically support the piston and the agitator in their elevated position, thereby insuring the removal of the teeth of the agitator from contact with the filter-bed during the process of filtration.

By means of the positive connection between the piston $a^7$ and its cylinder, effected, as described, by the radial lugs extended from the circumference of the piston into the longitudinal guideways in the cylinder, the said cylinder and piston form part of the rotary driving mechanism for the agitator, which construction reduces the friction caused by the reciprocation of the piston to such an extent as to enable the size or area of the filter-bed to be largely increased and the toothed agitator-arms to be correspondingly lengthened without increasing the power required to rotate the agitator, so that a minimum amount of power is required to rotate the agitator in a filter of maximum capacity. So, also, the reduction in friction referred to enables the piston and its attached agitator to be raised and lowered while in rotation with a minimum amount of fluid-pressure.

Another feature of this invention consists in an improved construction of the filter tank or vessel and of the well extended up through the filter-bed.

The filter tank or vessel is provided with a bottom composed of a series of sectional collecting trays or pans radiating from and connected to a central well, which is provided with two distinct chambers $c\ c'$. The chamber $c$ is formed, as shown, by a substantially large cylinder $c^2$ and the enlarged mouth or upper part of a pipe $c^4$, to which the cylinder is secured, as by bolts $c^x$, the pipes $c^4$ being extended down into and laterally through the chamber $c'$, which is formed by a cylinder $c^5$ integral with the pipe $c^4$. The cylinder $c^5$ is provided with a flanged opening $c^6$, to which is bolted or otherwise secured a pipe $c^7$, and at its upper end the cylinder $c^5$ is provided with a substantially thick annular flange $c^8$, which rests upon a wooden or other bottom wall of the tank or vessel, as shown in Fig. 2. In the present instance the bottom wall of the tank or vessel is represented as formed by two layers $c^9\ c^{10}$ of wood, which rest upon brick or other supports $c^{12}$, set upon a foundation $c^{13}$ of cement or other suitable solid material. The thickened flange $c^8$ is provided with suitable ports or passages $c^{15}$, which communicate with the chamber $c'$ and with which are connected the collecting pans or trays forming the bottom proper for the filter tank or vessel. The trays referred to may and preferably will be made as herein shown and consist of a bottom plate $c^{16}$, inclined downward from its outer end toward its inner end, and upright side walls $c^{17}\ c^{18}$ (see Fig. 4) and an upright outer rim $c^{19}$. (See Fig. 2.) The trays or pans may be provided with one or more longitudinal upright ribs or webs $c^{20}$, upon which rest cross-bars $c^{21}$, which serve to support the foraminous or perforated top $c^{22}$ for the said tray or pan. The top $c^{22}$ may and preferably will be made in sections of plates or strips of copper, brass, or bronze provided with substantially fine perforations, some only of which are shown in Fig. 3. The upright side walls $c^{17}\ c^{18}$ of the collecting-trays are preferably made so that their upper edges are in a substantially horizontal plane with the upper edge of the rim $c^{19}$, so as to support the perforated top $c^{22}$ in a horizontal plane and thereby form a horizontal surface, upon which the filter-bed $a$ may rest.

The upright side walls $c^{17}\ c^{18}$ of the trays converge from the outer rim $c^{19}$ toward the inner end of the tray (see Fig. 3) and are extended into or connected with the ports or passages $c^{15}$ in the thickened flange $c^8$. The radiating trays, with their perforated or foraminous tops, form radiating sections of the perforated supporting-bottom for the filter-bed and are preferably arranged about the central well, so as to leave radiating spaces between them, in which are placed pipes $c^{30}$, which communicate at their inner end with the chamber $c$ through ports or passages $c^{31}$ in the thickened flange $c^8$ and which communicate at their outer ends with curved castings or gutter-wells $d$, arranged in a circle about the lower part of the tank or vessel A and separated by spaces, which are filled with pieces $d'$, preferably of wood and of substantially the thickness of the gutter-castings, so as to form with the inner side of said castings a substantially smooth continuous circumferential inner wall for the lower part or half of the tank or vessel A, containing the filter-bed, and in close proximity to which the outermost teeth on the radial arms of the agitator may travel in the filter-bed, thereby insuring efficient washing of the filter-bed near the walls of the filter-tank. The gutter-castings form circumferential wells and extend above the filter-bed, so as to connect the water-space above the filter-bed with the chamber $c$ of the central well. The collecting-trays of the sectional bottom and the pipes $c^{30}$ are embedded in a substantially thick layer of cement $d^{10}$, as shown in Fig. 4.

The pipe $c^4$ has bolted or otherwise secured to it a pipe $d^{12}$, which is extended below the bottom of the filter-tank to the outside thereof, and the said pipe is provided with a suitable cut-off valve $d^{13}$, (see Fig. 1,) adapted to be operated by a valve stem or rod $d^{14}$, and with a branch pipe $d^{15}$, (indicated by dotted lines, Fig. 1,) which is provided with a valve $d^{16}$, operated by a stem or rod $d^{17}$.

The chamber $c'$ of the central well has connected to it the pipe $c^7$, extended in a substantially opposite direction below and beyond the filter, and this pipe is provided with a valve $d^{20}$, having an operating stem or rod $d^{21}$, and with a branch pipe $b^{22}$, (indicated by dotted lines, Fig. 1,) which also has a valve $d^{23}$, operated by a stem or rod $d^{24}$ and which may be connected to a tank or vessel containing filtered water.

In operation with the filter herein shown the agitator is preferably held suspended above the filter-bed, as shown in Fig. 1, and the water to be filtered is allowed to flow into the filter-tank above the filter-bed through the supply-pipe $d^{12}$, (the valve $d^{13}$ being open and the valve $d^{16}$ in the branch pipe $d^{15}$ being closed,) through the pipe $c^4$ and upper chamber $c$ of the center well, and also through the pipes $c^{30}$ and gutter-wells $d$. The unfiltered water percolates through the filter-bed into the collecting pans or trays, from which it flows through the ports $c^{15}$ into the lower chamber $c'$ of the central well, and from this chamber it passes through the outlet-pipe $c^7$, the valve $d^{20}$ being open and the valve $d^{23}$ in the branch pipe $d^{22}$ being closed.

When it is desired to wash the filter-bed, the valves $d^{13}$ $d^{20}$ are closed and the valves $d^{16}$ $d^{23}$ in the branch pipes $d^{15}$ $d^{22}$ are opened, and filtered water is forced through the pipe $c^7$ into the chamber $c'$, thence through the ports $c^{15}$ and collecting-trays into and up through the filter-bed, which at this time may be loosened up by the agitator, and after passing through the filtered bed the wash-water, with the impurities, passes down through the chamber $c$ of the central well and also into said chamber through the gutter-wells $d$ and pipes $c^{30}$, thence through the pipes $c^4$ $d^{12}$ and branch pipe $d^{15}$ to the sewer or other depository for the wash-water. When the filter-bed has been thoroughly washed, the agitator is raised, the valves $d^{16}$ $d^{23}$ are closed, and the valves $d^{13}$ $d^{20}$ again opened.

We have herein shown and described the filter-tank as provided with a bottom composed of a series of sectional pans or trays having foraminous tops to support the filter-bed and communicating with a central well; but such construction is not herein claimed, as it forms the subject-matter of a divisional application, Serial No. 695,280, filed by us November 2, 1898.

We claim—

1. In a filter, the combination of the following instrumentalities, viz: a tank or vessel, a filter-bed contained therein, an agitator for said filter-bed, a piston connected to said agitator to move the same, a cylinder in which said piston is reciprocated, and mechanical means to rotate said agitator and piston independent of the fluid employed to reciprocate said piston, substantially as described.

2. In a filter, the combination of the following instrumentalities, viz: a tank or vessel, a filter-bed contained therein, an agitator for said filter-bed, a piston connected to said agitator to move the same, a cylinder in which said piston is reciprocated, means to rotate said cylinder, and means to connect said piston to said cylinder to rotate therewith and yet permit said piston to reciprocate in said cylinder, substantially as described.

3. In a filter, the combination of the following instrumentalities, viz: a tank or vessel, a filter-bed contained therein, an agitator for said filter-bed, a piston connected to said agitator to move the same, a cylinder in which said piston is reciprocated, and means to mechanically lock said piston at the end of its stroke with the agitator in its elevated position, substantially as described.

4. In a filter, the combination of the following instrumentalities, viz: a tank or vessel, a filter-bed contained therein, a water-inlet pipe extended upward through the bottom of the tank or vessel and above the surface of the filter-bed, a vertically movable and rotatable agitator in said tank or vessel, a piston connected to said agitator, a cylinder in which said piston is adapted to be reciprocated to raise and lower said agitator, and means to effect rotation of said agitator independent of said water-inlet pipe, substantially as described.

5. In a filter, the combination of the following instrumentalities, viz: a tank or vessel, a filter-bed therein, a vertically movable and rotatable agitator in said tank or vessel, a piston connected to said agitator and provided with radial projections or lugs, a cylinder for said piston provided with longitudinal guideways in which said lugs or projections extend, and means to rotate said cylinder, substantially as described.

6. In a filter, the combination of the following instrumentalities, viz: a tank or vessel, a filter-bed therein, an agitator for said filter-bed, a reciprocating piston connected to said agitator, a cylinder for said piston provided with fluid-inlets at or near its opposite ends, and an automatic mechanical locking device for said piston in its elevated position, substantially as described.

7. In a filter, the combination of the following instrumentalities, viz: a tank or vessel, a filter-bed therein, an agitator for said filter-bed, a reciprocating piston connected to said agitator, a cylinder for said piston provided with fluid-inlets at or near its opposite ends, an automatic mechanical locking device for said piston in its elevated position, and means actuated by fluid-pressure to act on said locking device and release the said piston, substantially as described.

8. In a filter, the combination of the following instrumentalities, viz: a tank or vessel to contain the filter-bed, a central well, and a plurality of gutter castings or wells arranged about the lower part of the tank or vessel, and independent pipes connecting the said gutter-castings with the central well, substantially as described.

9. In a filter, the combination of the following instrumentalities, viz: a tank or vessel, a filter-bed therein, a central well consisting of an upper chamber $c$, a lower chamber $c'$ provided with a water-outlet opening, a pipe $c^4$ integral with the walls of the lower chamber and communicating with the upper chamber, a supply-pipe connected to the pipe $c^4$, and an outlet-pipe connected to the outlet-opening for the chamber $c'$, substantially as described.

10. In a filter, the combination of the following instrumentalities, viz: a tank or vessel, a filter-bed therein, a central well consisting of an upper chamber $c$, a lower chamber $c'$ provided with a water-outlet opening, a pipe $c^4$ integral with the walls of the lower chamber and communicating with the upper chamber, a supply-pipe connected to the pipe $c^4$, and an outlet-pipe connected to the outlet-opening for the chamber $c'$, branch pipes $d^{15}$, $d^{22}$ connected to the supply and outlet pipes, and valves in said supply, outlet, and branch pipes, substantially as described.

11. In a filter, the combination of the following instrumentalities, viz: a tank or vessel, a filter-bed therein, a central well, and a series of gutter wells or castings arranged about the lower part of the circumferential wall of the said tank with the inner faces in substantially the same circle, filling-pieces inserted between adjacent gutter-wells and having their inner faces in substantially the same circle as the inner faces of the gutter-wells, and means to connect the gutter-wells with the central well, substantially as described.

12. In a filter, the combination of the following instrumentalities, viz: a tank or vessel, a filter-bed therein, a central well consisting of a casting having a flange at its upper end provided with ports to connect the filter-tank with a chamber $c'$ in said casting below the bottom of said tank or vessel, a pipe $c^4$ integral with said casting, a pipe $d^{12}$ located below the bottom of the filter-tank and connected to the pipe $c^4$, and a pipe $c^7$ located below the bottom of the filter-tank and connected with the chamber $c'$, substantially as described.

13. The combination with a rotatable cylinder provided with longitudinal slots or guideways, of a piston reciprocating within said cylinder having lugs or projections extended into said slots or guideways to enable said piston to be rotated while it is being reciprocated in said cylinder, substantially as described.

14. The combination of the following instrumentalities, viz: a rotatable cylinder, a piston adapted to be reciprocated therein, and means to positively connect said piston to said cylinder to effect rotation of the piston while it is being reciprocated in the said cylinder, substantially as described.

15. In a filter, the combination of the following instrumentalities, viz: a tank or vessel, a filter-bed contained therein, a rotatable agitator, a cylinder and a piston located therein and connected thereto to rotate therewith, and means to rotate said cylinder, piston and agitator, substantially as and for the purpose specified.

In testimony whereof we have signed our names to this specification in the presence of two subscribing witnesses.

FRANKLIN AGGE.
    WALTER B. NYE.

Witnesses:
 JAS. H. CHURCHILL,
 J. MURPHY.